(12) United States Patent
Cameron et al.

(10) Patent No.: US 7,165,156 B1
(45) Date of Patent: Jan. 16, 2007

(54) READ-WRITE SNAPSHOTS

(75) Inventors: George R. Cameron, Santa Cruz, CA (US); Hueichian Huang, San Jose, CA (US)

(73) Assignee: 3PARdata, Inc., Fremont, CA (US)

( * ) Notice: Subject to any disclaimer, the term of this patent is extended or adjusted under 35 U.S.C. 154(b) by 507 days.

(21) Appl. No.: 10/655,961

(22) Filed: Sep. 4, 2003

Related U.S. Application Data

(60) Provisional application No. 60/409,311, filed on Sep. 6, 2002, provisional application No. 60/408,735, filed on Sep. 6, 2002.

(51) Int. Cl.
  *G06F 12/16* (2006.01)
(52) U.S. Cl. .................. 711/162; 711/202; 707/204
(58) Field of Classification Search ................ 711/162, 711/202; 707/204, 205
  See application file for complete search history.

(56) References Cited

U.S. PATENT DOCUMENTS

| | | | |
|---|---|---|---|
| 5,819,292 A | 10/1998 | Hitz et al. | |
| 5,963,962 A | 10/1999 | Hitz et al. | |
| 6,061,770 A | 5/2000 | Franklin | |
| 6,289,356 B1 | 9/2001 | Hitz et al. | |
| 6,341,341 B1 | 1/2002 | Grummon et al. | |
| 6,434,681 B1 * | 8/2002 | Armangau ................. | 711/162 |
| 6,604,118 B1 | 8/2003 | Kleiman et al. | |
| 6,823,376 B1 | 11/2004 | George et al. | |
| 6,829,617 B1 | 12/2004 | Sawdon et al. | |
| 2002/0083037 A1 | 6/2002 | Lewis et al. | |

OTHER PUBLICATIONS

Suresh B. Siddha et al., "A Persistent Snapshot Device Drive for Linux", published Sep. 13, 2001, downloaded from http://www.linuxshowcase.org/full_papers/siddha/siddha_html/index.html on May 15, 2002. 4 pages.
Dave Hitz et al., "File System Design for an NFS File Server Appliance", paper downloaded from http://www.netapp.com/tech_library/3002.html on Sep. 30, 2002, 13 pages.
"Snapshot Feature", LSI Logic Storage Systems, SANtricity brochure, 2 pages.
"The Enterprise Challenge Served by Snapshot", Whitepaper, LSI Logic Storage Systems, pp. 1-8.
Suresh B. Siddha et al., "A Persistent Snapshot Device Driver for Linux", Proceedings of the 5th Annual Linux Showcase & Conference, Oakland, CA, USA, Nov. 5-10, 2001.

* cited by examiner

*Primary Examiner*—Jack A. Lane
(74) *Attorney, Agent, or Firm*—Patent Law Group LLP; David C. Hsia

(57) ABSTRACT

A chain of snapshots includes read-write snapshots descending from a read only snapshot. The read only snapshots presents a constant view of the data at the time the read only snapshot is created, and the read-write snapshot starts with the view but can be modified by the user without changing the view of its parent snapshot (e.g., the read only snapshot). Accordingly, the read-write snapshot can be written for various testing purposes while the read only snapshot remains undisturbed to preserve the original data.

12 Claims, 12 Drawing Sheets

READ-WRITE SNAPSHOTS

CROSS-REFERENCE TO RELATED APPLICATIONS

This application claims the benefit of U.S. Provisional Application Nos. 60/408,735 and 60/409,311, both filed Sep. 6, 2002, which are incorporated herein by this reference. This application is related to U.S. application Ser. Nos. 10/655,951 and 10/655,963 both filed Sep. 4, 2003 which are incorporated herein by this reference.

FIELD OF THE INVENTION

This invention relates to storage management computer programs and in particular to storage management programs that create snapshots.

DESCRIPTION OF RELATED ART

A storage management program uses snapshots to bring back or to place into use previous instances of data in time. After a snapshot is created, the storage management program copies the original data into the snapshot before writing over the original data.

A storage management program may invoke a copy-on-write ("COW") operation to copy a data block before that data block is modified by a write. Generally only the first write of a given data block causes a COW operation ("a COW push") to a snapshot. Subsequent writes are allowed to go directly to the data block.

Alternatively, the storage management program may invoke a complete copy of all the data blocks to the snapshot. After the complete copy, all of the data blocks can be modified.

SUMMARY

In one embodiment of the invention, a chain of snapshots for preserving data includes a read only snapshot and a read-write snapshot descending from the read only snapshot. The read only snapshot presents a constant view of the data at the time the read only snapshot is created, and the read-write snapshot starts with the view but can be modified by the user without changing the view of its parent snapshot (e.g., the read only snapshot). In one embodiment, the read only snapshot and the read-write snapshot may each include a first table with entries corresponding to first parts of block addresses, a second table with entries corresponding to second parts of block addresses, and a third table with entries corresponding to third parts of block addresses. In one embodiment, at least one of the entries in the first or the second table contains a pointer to a page of data blocks. In one embodiment, at least one of the entries in the first, the second, or the third table contain a pointer to another snapshot.

DETAILED DESCRIPTION

Figure 1:
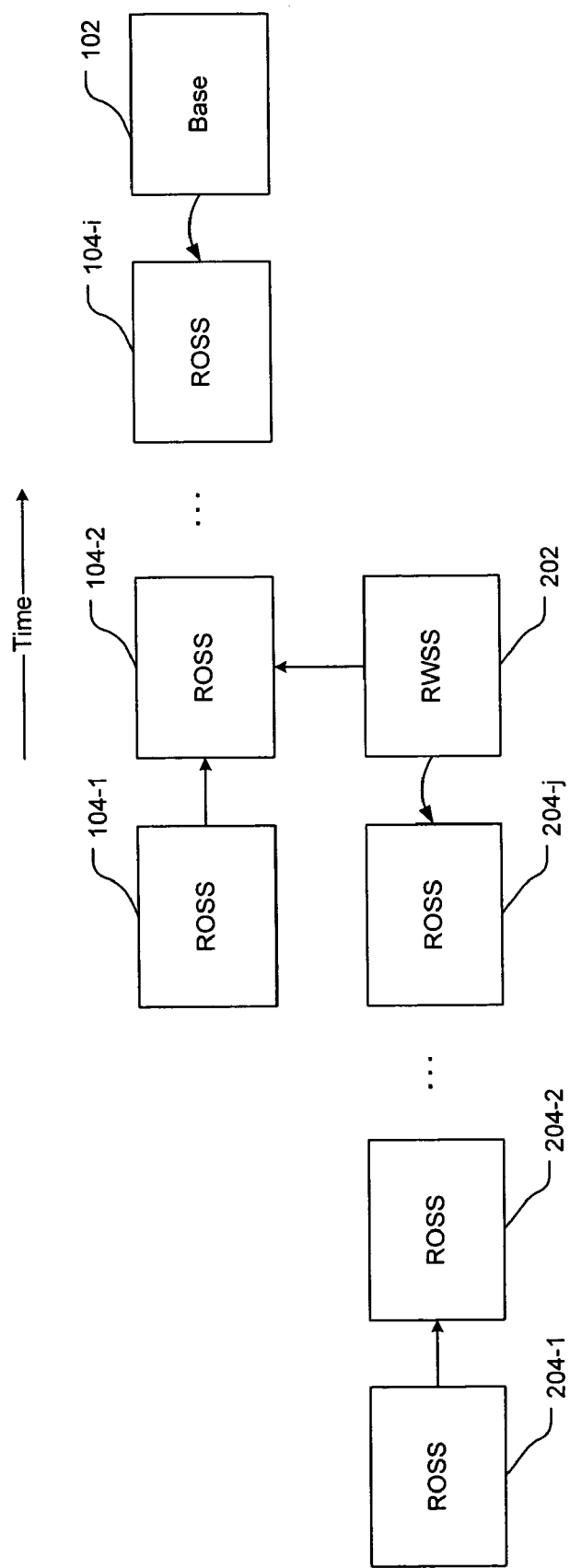
FIG. 1 illustrates a block diagram of a chain of snapshots including a read-write snapshot ("RWSS") descending from a read only snapshot ("ROSS") of a base volume in one embodiment of the invention.

FIG. 1 illustrates a chain of snapshots of a base volume 102 in one embodiment. Base volume 102 consists of blocks of data on a physical disk or a virtual disk made up of multiple physical disks. A storage management program creates snapshots of base volume 102 periodically or under user commands. The storage management program is, e.g., software executed by a processor. Used herein, a "user" can be human or other software executed by a processor.

In one example, one embodiment of the storage management program creates a chain of snapshots 104-1, 104-2 . . . , and 104-$i$ that descend from base volume 102. Snapshot 104-1 is the first and the oldest snapshot created in time while snapshot 104-$i$ is the most recent and the last snapshot created in time.

In one example, snapshots 104-1 to 104-$i$ are read only snapshots ("ROSS"). A ROSS presents a constant view of the data at a specific time to the user. While a particular ROSS is the most recent snapshot, the storage management program invokes copy-on-write ("COW") operations to copy data blocks from the base volume to the snapshot before those base data blocks are modified by write operations. Only the first write of a given base data block causes a COW operation. The storage management program allows subsequent writes of the base data block to go directly to the base volume. In summary, the first write to a data block in the base volume causes a COW to the most recent ROSS.

A user may desire to run a test program against the original data but does not desire to modify that data. Thus, one embodiment of the storage management program creates a read-write snapshot ("RWSS") that the user desires to write. The RWSS descends from a ROSS (e.g., a parent snapshot). For example, the storage management program creates RWSS 202 that descends from ROSS 104-2. A RWSS is a place to hold modifications to the parent ROSS. RWSSes can be read and written like a base volume. Thus, a RWSS can be written for testing purposes while the parent ROSS remains unchanged to preserve the original data.

In one example, one embodiment of the storage management program creates a chain of snapshots 204-1, 204-2 . . . , and 204-$j$ that descend from RWSS 202 in response to user commands. The storage management program treats RWSS 202 as a base volume, such as base volume 102. In one embodiment of the invention, snapshots 204-1 to 204-j are ROSSes. The storage management program invokes a COW operation to copy a data block into the most recent ROSS before that data block is modified by a write operation to RWSS 202. For each snapshot, only the first write of a given data block causes a COW push. Subsequent writes of the data block are allowed to go directly to RWSS 202.

Figure 2:
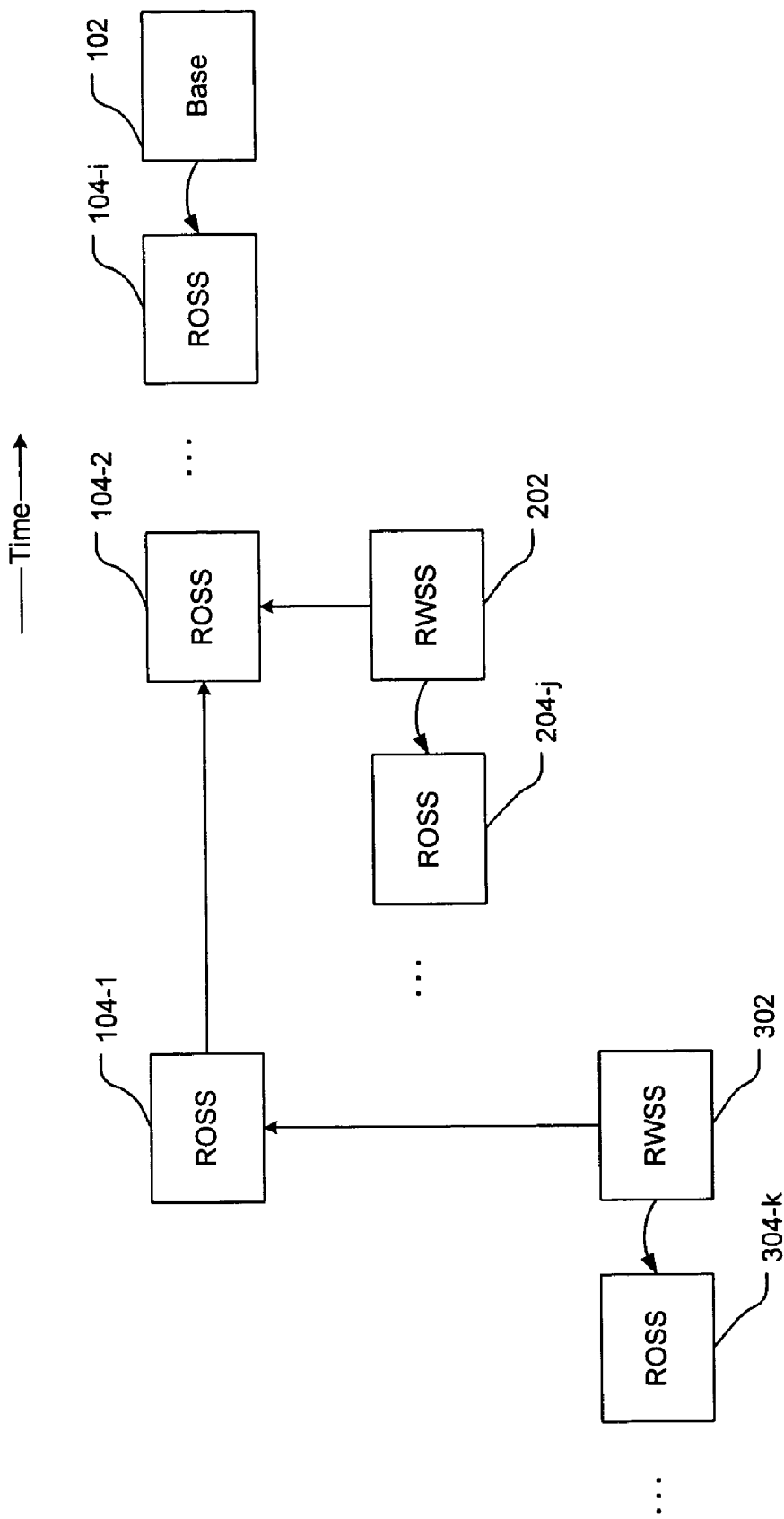
FIG. 2 illustrates a block diagram of a chain of snapshots including multiple RWSSes descending from ROSSes of a base volume in one embodiment.

FIG. 2 illustrates a chain of snapshots of a base volume 102 in one embodiment. As can be seen, multiple RWSSes can be created for multiple ROSSes that descend from the same base volume. For example, the storage management program creates RWSS 202 descending from ROSS 104-2, and RWSS 302 descending from ROSS 104-1. Each of the RWSSes may have descending ROSSes, and each ROSS may have both descending RWSSes and ROSSes.

Figure 3:
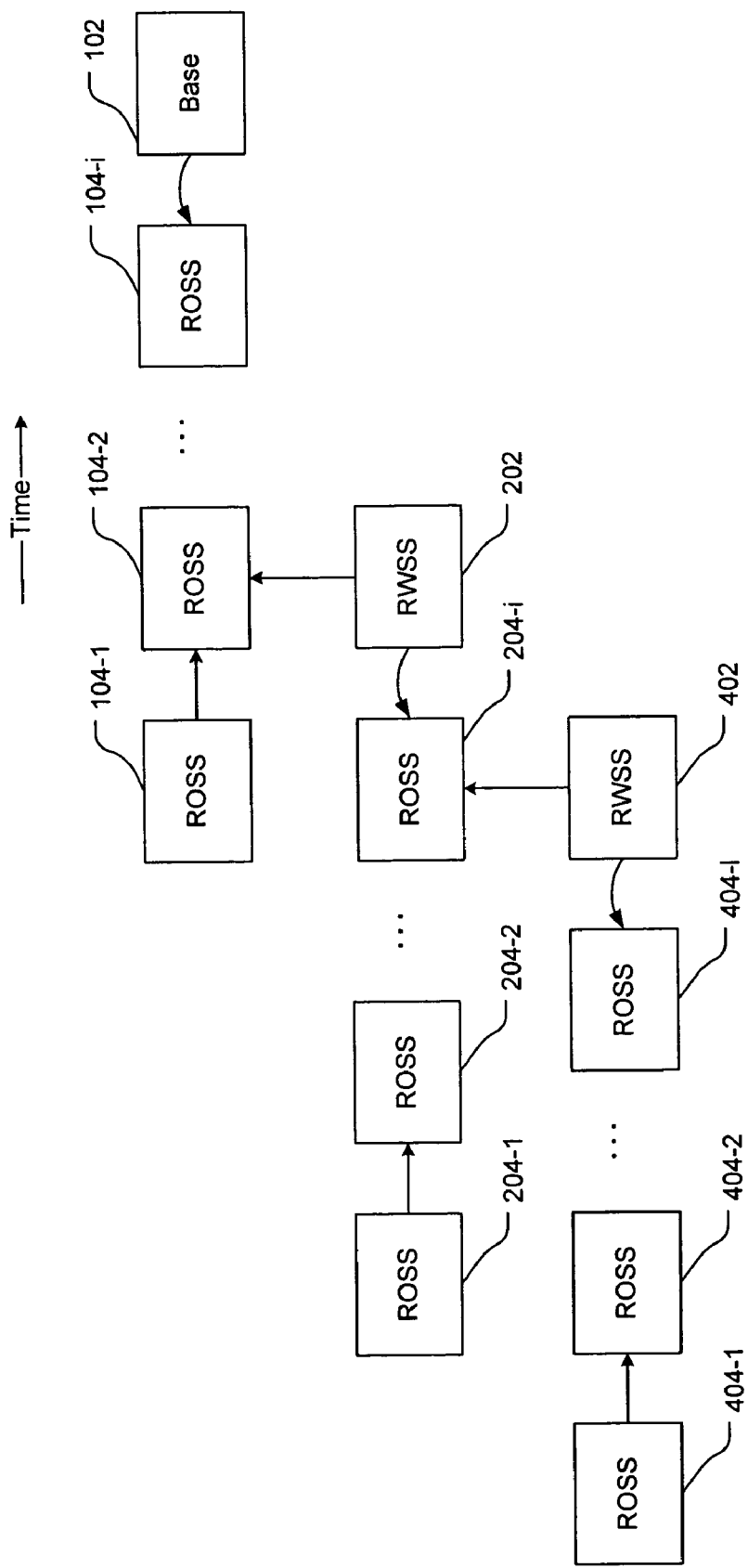
FIG. 3 illustrates a block diagram of a chain of snapshots including a RWSS descending from a ROSS of a RWSS in one embodiment.

FIG. 3 illustrates a chain of snapshots of base volume 102 in one embodiment. As can be seen, a RWSS can descend from a ROSS of another RWSS. For example, the storage management program creates RWSS 402 descending from ROSS 204-i of RWSS 202. Each of the RWSSes may have descending ROSSes, and each ROSS may have both descending RWSSes and ROSSes.

Figure 8:
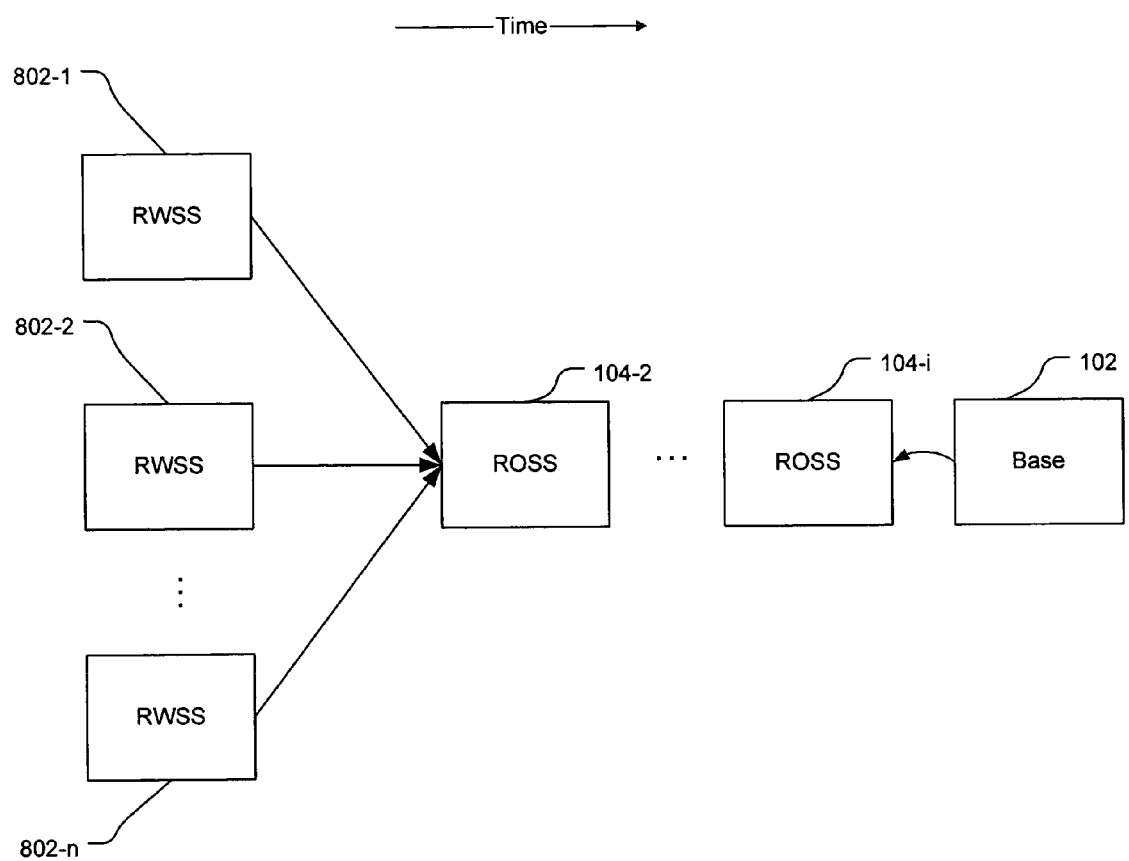
FIG. 8 illustrates a block diagram of a chain of snapshots including multiple RWSSes descending from the same ROSS in one embodiment.

FIG. 8 illustrates a chain of snapshots of base volume 102 in one embodiment. As can be seen, multiple RWSSes can descend from the same ROSS. For example, the storage management program creates RWSS 802-1, 802-2 . . . , 802-n descending from ROSS 104-2. Each of the RWSSes may have descending ROSSes, and each ROSS may have both descending RWSSes and ROSSes. As shown in FIGS. 1 to 3 and 8, the embodiments of the storage management program will support arbitrary user requests for ROSS and RWSS creation.

Figure 4A:
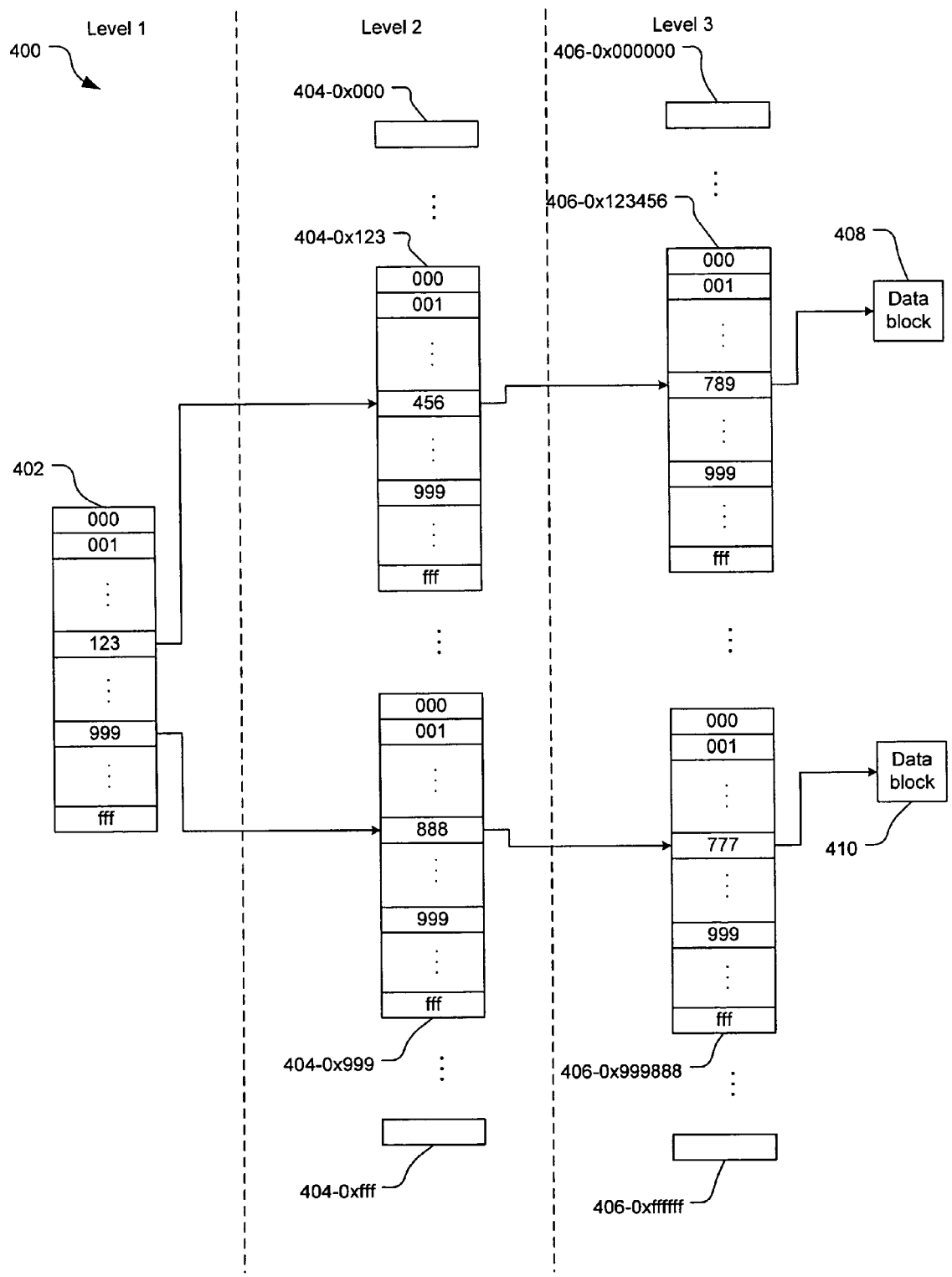
FIG. 4A illustrates a representation of the preserved copy-on-write data of a read only snapshot, or the user data of a read-write snapshot in one embodiment.

FIG. 4A illustrates a representation of a snapshot 400 in one embodiment. Snapshot 400 can be saved in memory and on disk. Snapshot 400 can be a ROSS or a RWSS, where the only difference being that a ROSS can only be written before a more recent ROSS is created while a RWSS can be written anytime like a base volume. Snapshot 400 includes data blocks and multiple address tables that infer the block addresses of the data blocks in the base volume ("block addresses"). If snapshot 400 were a ROSS, it would contain data saved in COW operations to the base volume. If snapshot 400 were a RWSS, it would contain data written by the user.

Figure 4B:
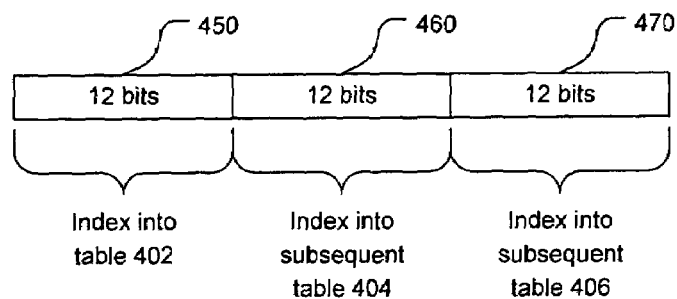
FIG. 4B illustrates a base block address divided into three parts in one embodiment.

Each of the block addresses is divided into parts. FIG. 4B illustrates one embodiment where the block address is divided into three parts 450, 460, and 470. Subsequently the address tables are divided into three levels for indexing the block addresses to data blocks saved in snapshot 400. A level 1 table (e.g., table 402) consists of entries that can be indexed by the first part 450 of the block addresses. Each of the level 2 tables (e.g., table 404-0x000 to 404-0xfff in one embodiment, where 0x indicates a hexadecimal address) consists of entries that can be indexed by the second part 460 of the block addresses. Each of the level 3 tables (e.g., tables 406-0x000000 to 406-0xffffff in one embodiment) consists of entries that can be indexed by the third part 470 of the block addresses. Each of the entries in the level 1 table may contain a pointer to one of the level 2 tables, and each of the entries in the level 2 tables may contain a pointer to one of the level 3 tables, and each of the entries in the level 3 tables may contain a pointer to one of the data blocks. The storage management program initially creates snapshot 400 with only a blank level 1 table. As data blocks are saved to snapshot 400 (described later), the storage management program adds the level 2 and level 3 tables that are necessary to manage those data blocks.

Figure 12:
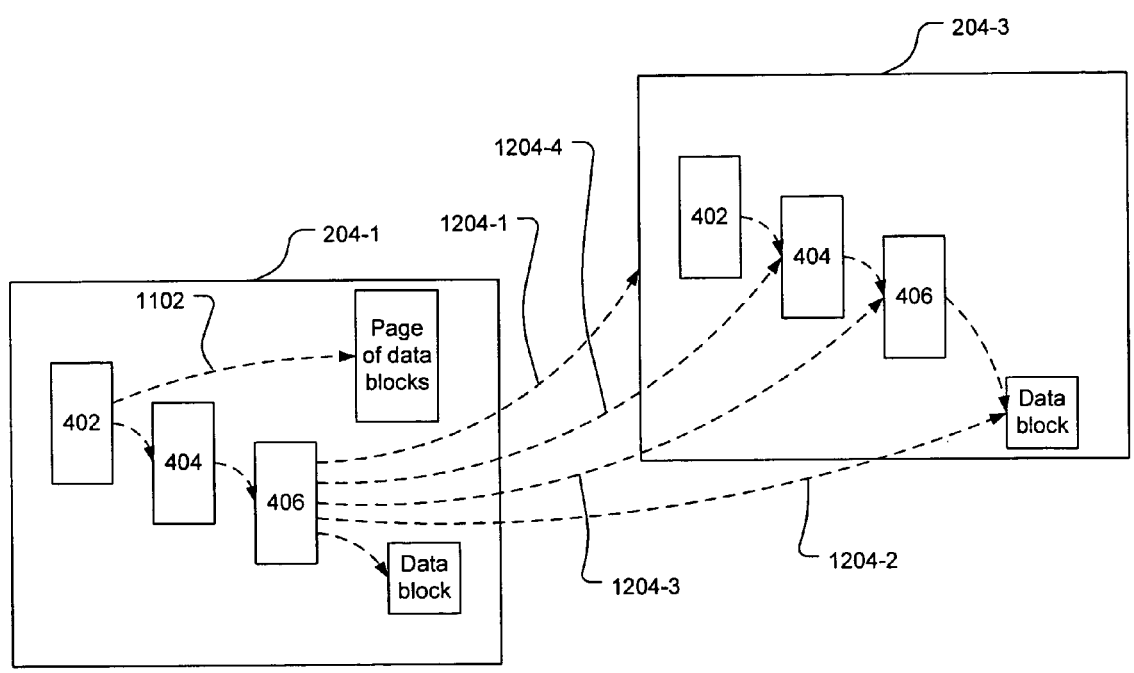
FIG. 12 illustrates various types of skip-pointers in a snapshot in one embodiment.

In one example, an entry in the level 1 table 402 may contain a pointer to a page of contiguous data blocks instead of a pointer to a level 2 table. This is because these data blocks are contiguously written to the snapshot so their addresses take up an entire level 2 table and all the level 3 tables that branch from the level 2 table. In other words, these data blocks consist of all the data blocks in the snapshot that share the first part of their block addresses. To save space, the level 2 table and the level 3 tables are not created and a single entry in the level 1 table contains a pointer directly to these data blocks (e.g., a pointer in entry 0x123 leads to a page of data blocks having block addresses that range from 0x123000000 to 0x0123ffffff). In this example, this page would have a size of 1024×1024×block size. The block size can vary depending on the embodiment. FIG. 12 illustrates an example where an entry in level 1 table 402 of ROSS 204-1 contains a pointer 1102 to a page of contiguous data blocks.

In another example, an entry in the level 2 table 404 may contain a pointer to a page of data blocks instead of a pointer to a level 3 table. This is because these data blocks are contiguously written so their addresses take up an entire level 3 table. In other words, these data blocks consist of all the data blocks in the snapshot that share both the first part and the second part of their block addresses. To save space, the level 3 table is not created and a single entry in the level 2 table may contain a pointer directly to a page of these data blocks (e.g., a pointer in entry 0x456 leads to a page of data blocks having addresses that range from 0x*456000 to 0x*456fff). In this example, this page would have a size of 1024×block size.

Figure 5:
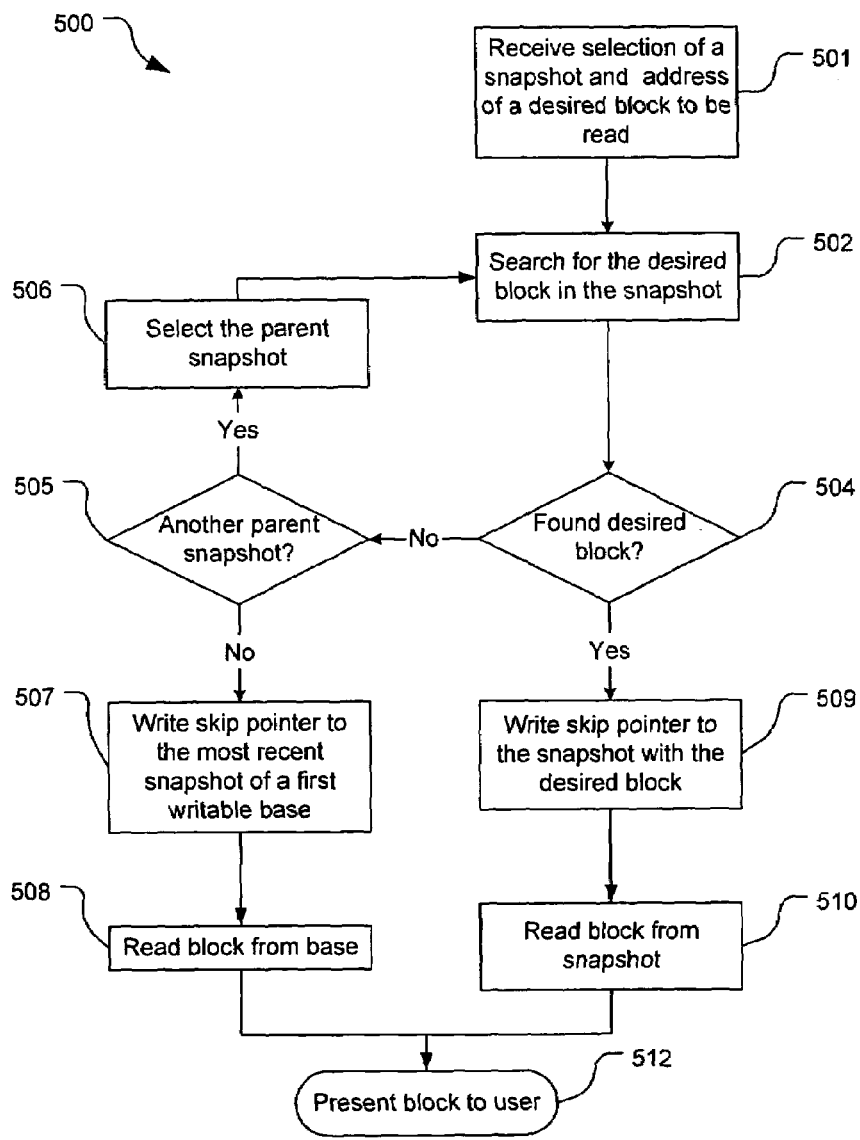
FIG. 5 illustrates a flowchart of a method to read a ROSS of a RWSS in one embodiment.

FIG. 5 illustrates one embodiment of a method 500 for reading a data block from a snapshot descending from a RWSS at the request of a user in one example. In action 501, the storage management program receives a read request for a desired data block in a selected snapshot (e.g., block 0x123456789 in a ROSS 204-2 in FIG. 1).

In action 502, the storage management program searches the snapshot for the data block in the following manner. The storage management program first uses the first part of the desired block address to index an entry in the level 1 table (e.g., looks at entry 0x123 in table 402 associated with ROSS 204-1). The entry may contain a pointer to a level 2 table. If the entry contains a valid pointer, the storage management program follows the pointer to the level 2 table and uses the second part of the desired block address to index an entry in the level 2 table (e.g., looks at entry 0x456 in table 404-0x123 associated with ROSS 204-1). The entry may contain a pointer to a level 3 table. If the entry contains a valid pointer, the storage management program follows the pointer to the level 3 table and uses the third part of the desired block address to index an entry in the level 3 table (e.g., looks at entry 0x789 in table 406-0x123456 associated with ROSS 204-1). The entry may contain a pointer to data block 408 if data block 0x123456789 is stored in the selected snapshot.

In one embodiment, each entry in the address tables includes a type field. The type field indicates whether the pointer in the entry leads to (1) another address table in the current snapshot, (2) a data block in the current snapshot, (3) an address table of another snapshot, or (4) a data block in another snapshot. Of course, the type field can also indicate that the entry is null because there is no data at that particular address.

Type (1) pointer leads to another address table in the current snapshot and type (2) pointer leads to the data block in the current snapshot. As described above, an entry in the level 1 table may contain a pointer to another address table or directly to a page of contiguous data blocks in the current snapshot. Similarly, an entry in the level 2 table may contain a pointer to another address table or directly to a page of contiguous data blocks.

Type (3) pointer is one of the "skip-pointers" described later in actions 507 and 509. Type (3) pointer can be divided into three subtypes that lead indirectly to the data block. In a first subtype, the pointer in an address table representing a particular address leads to an address table representing the same address in a more recent snapshot. FIG. 12 illustrates one example where a skip-pointer 1204-3 in a table 406 of ROSS 204-1 leads to a corresponding table 406 of ROSS 204-3. In a second subtype, the pointer in a particular level of address table representing a particular address leads to an address table of a lower level that matches that particular address up to that lower level. FIG. 12 illustrates one example where a skip-pointer 1204-4 in a level 3 table 406 of ROSS 204-1 leads to a level 2 table 404 of ROSS 204-3 that matches the address up to level 2. In a third subtype, the pointer in an address table of a particular address leads to a more recent snapshot because the address table representing the same address has not been created in that more recent snapshot. FIG. 12 illustrates one example where a skip-pointer 1204-1 in table 406 of ROSS 204-1 leads only to ROSS 204-3 if corresponding table 404 of ROSS 204-3 has not been created.

Type (4) pointer is also one of "skip-pointers" described later in actions 507 and 509. Type (4) pointer leads directly to the data block itself in a more recent snapshot. FIG. 12 illustrates one example where a skip-pointer 1204-2 in an entry in table 406 of ROSS 204-1 points to the data block in ROSS 204-3.

In action 504, the storage management program determines if the data block is stored in the snapshot. If so, action 504 is followed by action 509. If the data block is not stored in the snapshot, action 504 is followed by action 505.

In action 505, the storage management program determines if the snapshot has a parent snapshot (i.e., if the selected snapshot descends from another snapshot). If so, action 505 is followed by action 506. If the snapshot does not have a parent snapshot, then action 505 is followed by action 507.

In action 506, the storage management program selects the parent snapshot (i.e., the snapshot that is the next most recent in time). Action 506 is followed by action 502 where the storage management program searches for the data block with the same address in the parent snapshot.

Figure 10:
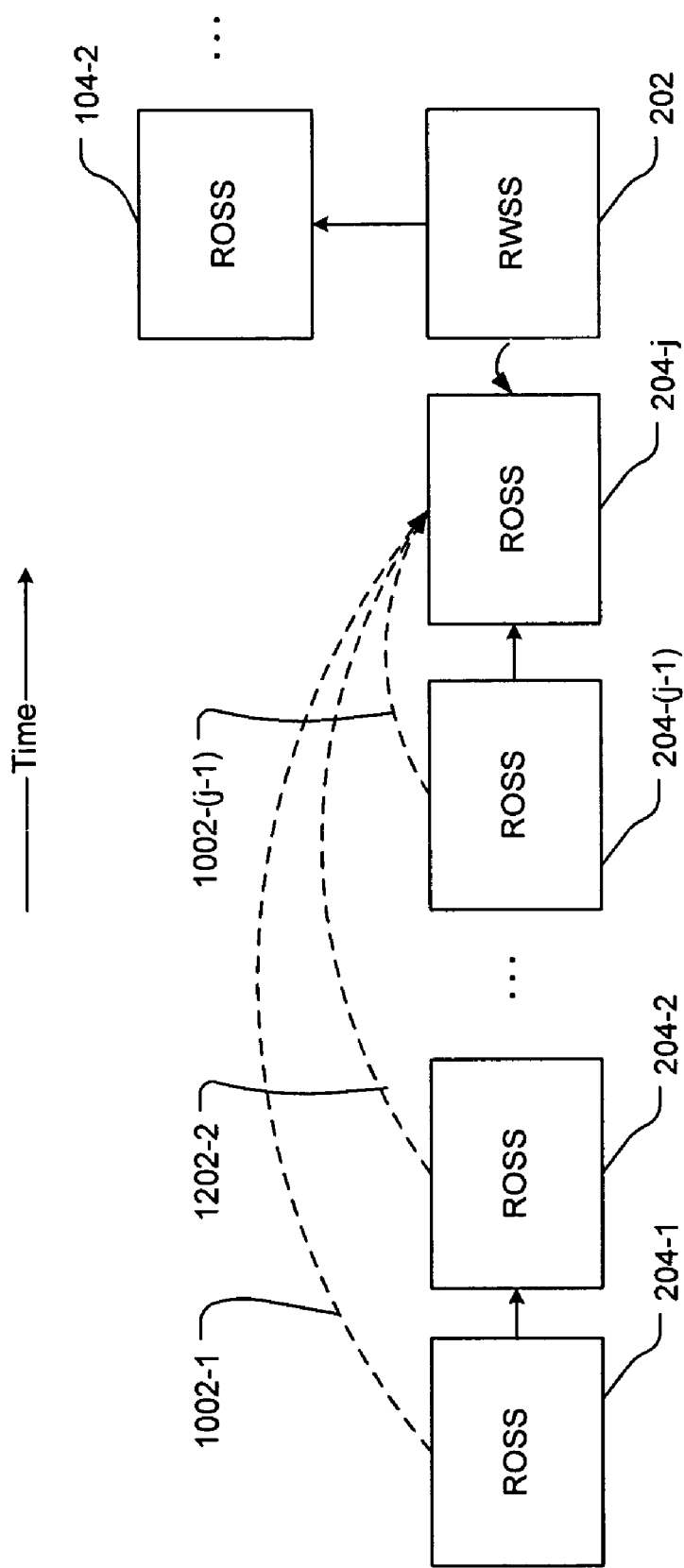
FIG. 10 illustrates a chain of snapshots with skip-pointers to the most recent snapshot in one embodiment.

In action 507, the storage management program writes a skip-pointer in the null entries of the address tables in all of the snapshots that were searched in previous cycles through actions 502, 504, 505, and 506 that correspond to the desired block address. These skip-pointers lead to the most recent snapshot descending from a first writable base (i.e., a RWSS or a base volume, whichever comes first) in the chain between the selected snapshot of action 501 and the base volume. Thus, whenever the selected snapshot of action 501 is read for the desired data block, the skip-pointer would lead the storage management program directly to the first snapshot that could contain the desired data block. FIG. 10 illustrates one example where ROSSes 204-1 to 204-(j−1) have skip-pointers 1002-1 to 1002-(j−1) to the most recent snapshot 204-j of RWSS 202 as the result of either action 507.

In action 508, the storage management program reads the data block from the base volume. Action 508 is followed by action 512.

In action 509, the storage management program writes a skip-pointer in the selected snapshot of action 501. The skip-pointer leads to a more recent snapshot that contains the desired data block or the desired data block itself in the more recent snapshot. Thus, whenever the selected snapshot of action 501 is subsequently read for the desired data block, the skip-pointer would lead the storage management program directly to the snapshot containing the desired data block or the desired data block itself.

Figure 11:
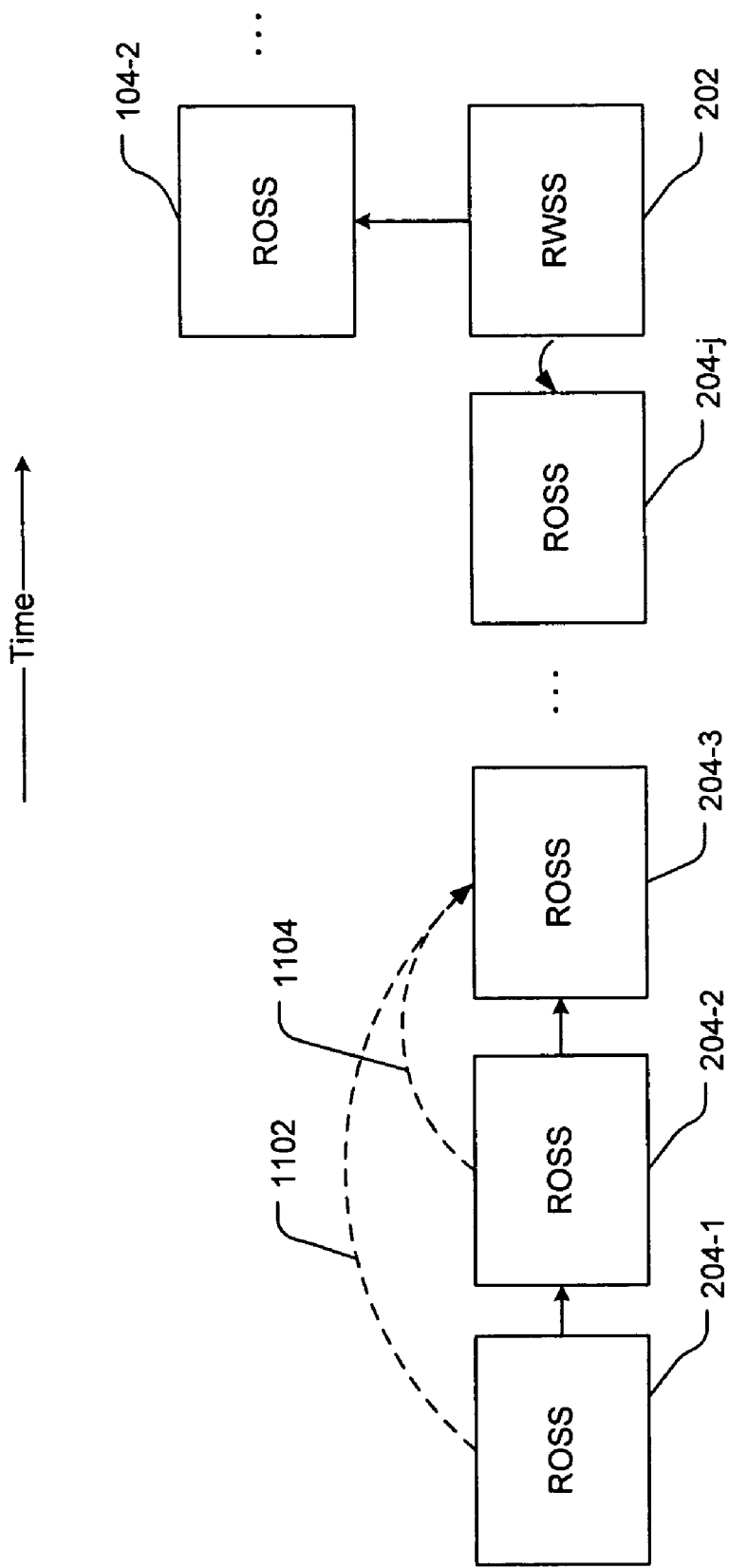
FIG. 11 illustrates a chain of snapshots with skip-pointers to a snapshot that contains the desired data block in one embodiment.

The storage management program may also write the skip-pointer in the null entries of the address tables that correspond to the desired block address in all of the snapshots that were searched in previous cycles of actions 502, 504, 505, and 506. In other words, the storage management program may also write the skip-pointer to the intermediate snapshots that are in the chain between the selected snapshot of action 501 and the more recent snapshot containing the desired data block or the desired data block itself. This will speed up the search for the data block in a chain of snapshots. FIG. 11 illustrates one example where ROSSes 204-1 and 204-2 have respective skip-pointers 1102 and 1104 to ROSS 204-3 that contains the desired data block as a result of action 509.

In action 510, the storage management program reads the data block from the selected snapshot. Action 510 is followed by action 512.

In action 512, the storage management program returns the data block to the user and ends method 500.

Figure 6:
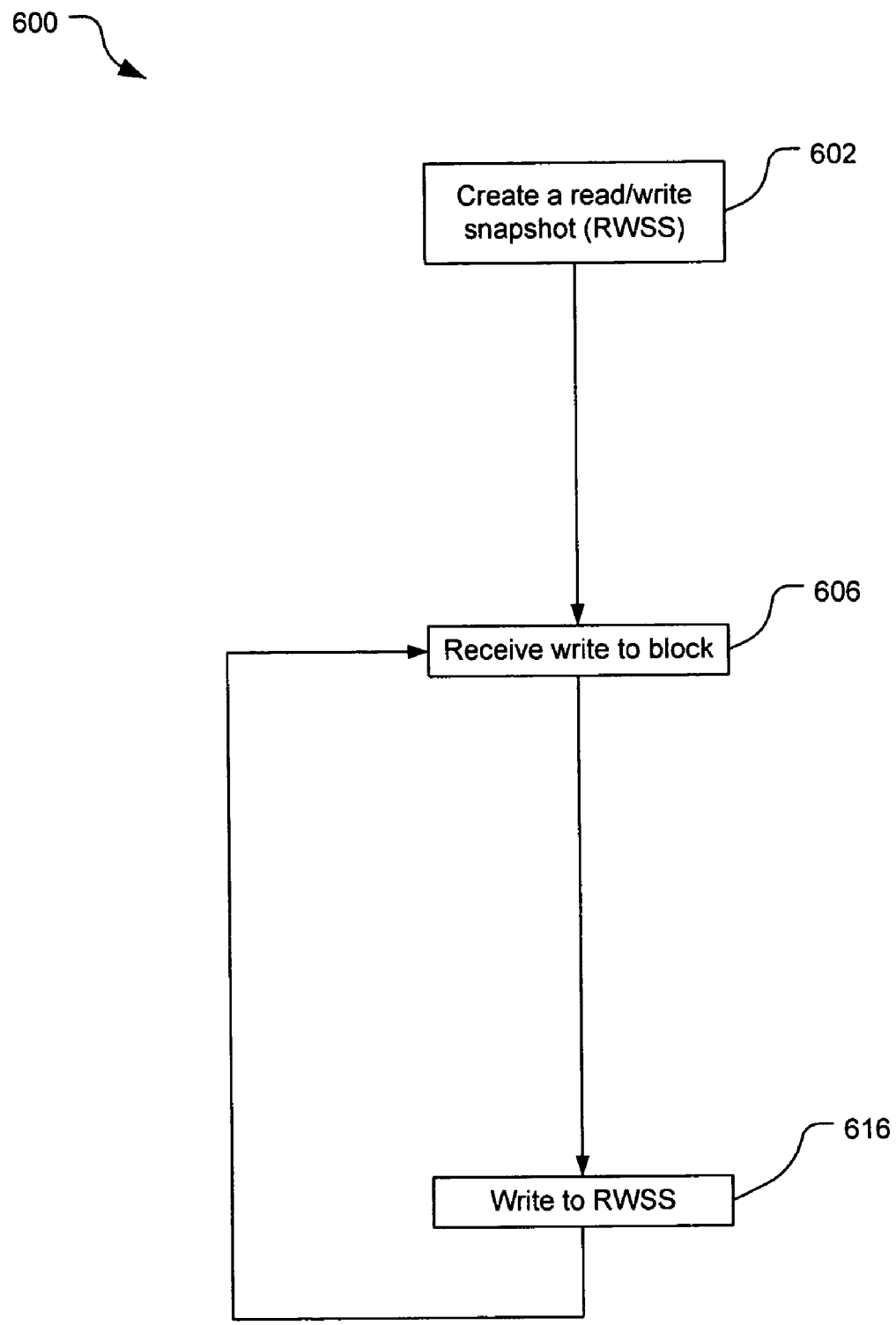
FIGS. 6 and 7 illustrate flowcharts of two methods to write to a RWSS in two embodiments.

FIG. 6 illustrates a method 600 for writing to a RWSS in one embodiment. In action 602, the storage management program creates a RWSS descending from a parent (e.g., RWSS 202 descending from ROSS 104-2 in FIG. 1).

In action 606, the storage management program waits and then receives a base block address of a data block to be written in the RWSS from the user (e.g., address 0x999888777 of RWSS 202 in FIG. 1).

In action 616, the storage management program allows the write to the data block in the RWSS. The storage management program writes the data block to the ROSS in the following manner.

The storage management program first uses the first part of the block address of the data block to index an entry in the level 1 table (e.g., looks at entry 0x999 in table 402 associated with ROSS 204-j). The entry may contain a valid pointer to a level 2 table. If the entry contains a valid pointer, the storage management program follows the pointer to the level 2 table and uses the second part of the block address to index an entry in the level 2 table (e.g., looks at entry 0x888 in table 404-0x999 associated with ROSS 204-j). The entry may contain a pointer to a level 3 table. If the entry contains a valid pointer, the storage management program follows the pointer to the level 3 table and uses the third part of the block address to index an entry in the level 3 table (e.g., looks at entry 0x777 in table 406-0x999888 associated with ROSS 204-j). The storage management program then writes the data block (e.g., data block 410) in the snapshot and writes a pointer to the data block in entry 0x777 in level 3 table 406-0x999888.

As described above, the storage management program may need to add the level 2 table 404 and the level 3 table 406 if they were not previously created. After the storage management program adds the level 2 and level 3 tables, the storage management program writes the appropriate pointers in their entries. Furthermore, the storage management program may not need to create the level 2 table if the written data blocks are contiguous and take up an entire level 2 table and all the associated level 3 tables. Thus the entries in the level 1 table may contain pointers directly to a page of contiguous data blocks. Similarly, the storage management program may not need to create the level 3 table if the written data blocks are contiguous and take up an entire level 3 table. Thus the entries in the level 2 table may contain pointers directly to a page of contiguous data blocks.

Action 616 is followed by action 606 where the storage management program waits to receive another write to the RWSS.

Figure 7:
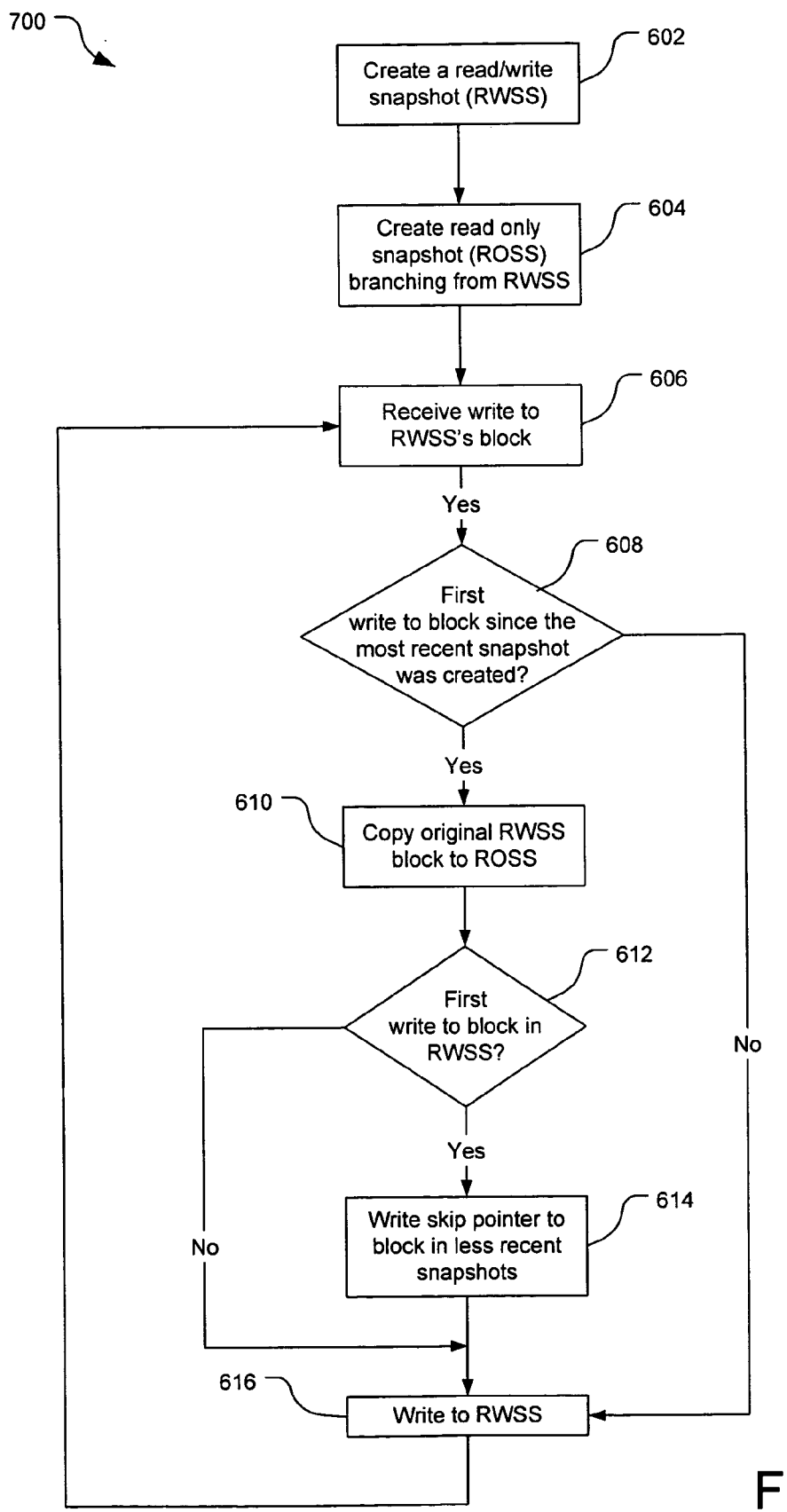

FIG. 7 illustrates a method 700 for writing to a RWSS with a descending ROSS in one example. In action 602, the storage management program creates a RWSS descending from a parent (e.g., RWSS 202 descending from ROSS 104-2 in FIG. 1).

In action 604, the storage management program creates a ROSS that descends from the RWSS (e.g., ROSS 204-$j$ descending from RWSS 202 in FIG. 1).

In action 606, the storage management program waits and then receives the block address of a data block to be written in the RWSS from the user (e.g., address 0x999888777 of RWSS 202 in FIG. 1).

In action 608, the storage management program determines if this is the first write to that data block since the most recent snapshot was created in action 604 by searching for the data block in the most recently created snapshot (e.g., by traversing the address tables associated with ROSS 204-$j$). If the block cannot be found in the ROSS, then this is the first write to that block. Searching for the block in a snapshot is the same as described above for action 502 but using the appropriate tables for ROSS 204-$j$. If this is the first write to the data block, then action 608 is followed by action 610. Otherwise action 608 is followed by action 616.

In action 610, the storage management program invokes a COW operation to copy the contents of the data block to the ROSS in the following manner. The storage management program first tries to read the data block from the RWSS. Reading the block in the RWSS is the same as described above for method 500 but using the appropriate tables for RWSS 202. For example, if the storage management program cannot find the data block in the RWSS, the storage management program needs to search for the data block in one or more parent snapshots or in the base volume.

Once the block has been read, then the storage management program writes the data block to the ROSS. The method to write to the ROSS is the same as the write to the RWSS described above in method 600 but using the appropriate tables for ROSS 202-$j$.

In action 612, the storage management program determines if this will be the first write to a particular block in the RWSS. If not, action 612 is followed by action 616. If this will be the first write to a particular block in the RWSS, then action 612 is followed by action 614. The storage management program can determine if this is a first write by searching for this block in all the snapshots that descend from the RWSS. If this block cannot be found, then this is the first write to this block in the RWSS.

In action 614, the storage management program writes a skip-pointer to the block in one or more of the less recent snapshots. The storage management program writes the skip-pointer in the null entries of the address tables in the less recent snapshots. Thus, when any of the less recent snapshots are read for the data block, the skip-pointer would lead the storage management program to the snapshot with the data block. FIG. 10 illustrates one example where ROSS 204-1 to 204-($j$–1) have skip-pointers 1002-1 to 1002-($j$–1) to the most recent snapshot 204-$j$ of RWSS 202 that contains the data block.

In action 616, the storage management program allows the write to the data block in the RWSS. The method to write to the RWSS is the same as the write to the RWSS described above in method 600. Action 616 is followed by action 606 where the storage management program waits to receive another write to the RWSS.

Method 700 (FIG. 7) can be used to write to a base volume in one embodiment. In such an embodiment, all "RWSS" are replaced with "base volume" in the actions of method 700. Furthermore, no address tables are created in the base volume and data are simply written to the memory or disk space delineated as the base volume.

Figure 9:
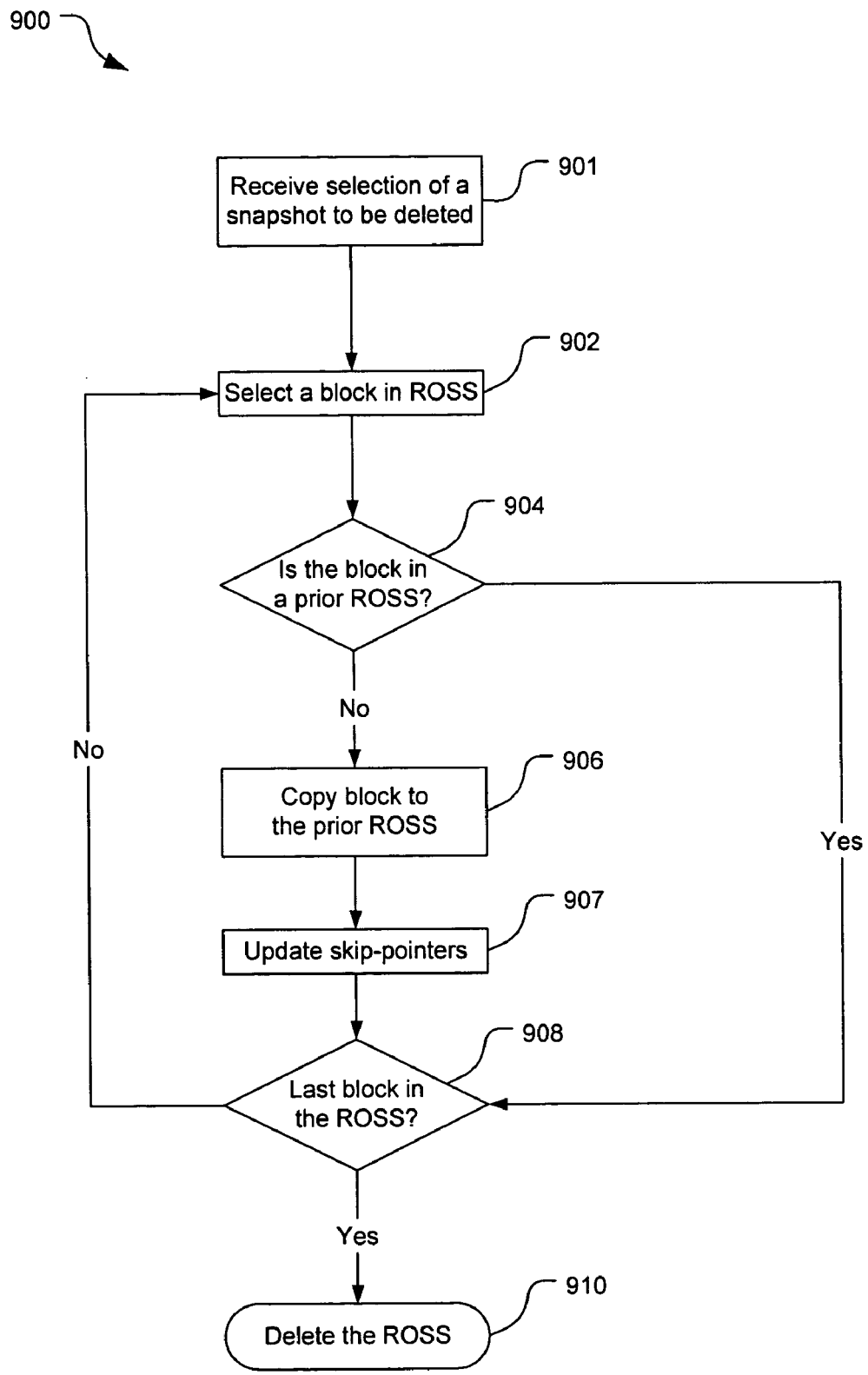
FIG. 9 illustrates a flowchart of a method to delete a snapshot from a chain of snapshots in one embodiment.

The storage management program may delete a snapshot to conserve memory or disk space under user command. To delete a snapshot, the storage management program merges the to-be-deleted snapshot with an adjacent older snapshot to preserve any original data stored in the to-be-deleted snapshot that the older snapshots depended on. FIG. 9 illustrates one embodiment of a method 900 to delete a snapshot in a chain of snapshots. In one example, the user commands the storage management program to delete ROSS 204-2 in FIG. 1.

In action 901, the storage management program receives the user command to delete ROSS 204-2. In action 902, the storage management program selects a data block in ROSS 204-2.

In action 904, the storage management program determines if there is a data block in the adjacent older snapshot (e.g., ROSS 204-1) with the same address as the selected data block in ROSS 204-2. If so, action 904 is followed by 908. If there is not a data block in the adjacent older ROSS 204-1 with the same address as the selected data block in ROSS 204-2, then action 904 is followed by action 906.

In action 906, the storage management program copies the selected data block from ROSS 204-2 to ROSS 204-1. The method to write to ROSS 204-1 is the same as the write to the RWSS described above in method 600 but using the appropriate tables for ROSS 202-1. Alternatively, to save a data copy operation, the storage management program can write a pointer in the address table entry of ROSS 204-1 that corresponds to the address of the selected data block. This pointer leads to the selected data block in ROSS 204-2. Action 906 is followed by action 907.

In action 907, the storage management program searches backwards for skip-pointers in other older snapshots that point to the selected data block in the snapshot to be deleted. The storage management program then updates the skip-pointers to lead to the selected data block in its new snapshot location (e.g., ROSS 204-1).

In action 908, the storage management program determines if the selected data block from ROSS 204-2 is the last block in ROSS 204-2. If so, action 908 is followed by action 910. If the selected data block is not the last data block in ROSS 204-2, action 908 is followed by action 902 and method 900 cycles until the storage management program has examined each data block saved in ROSS 204-2.

In action 910, the storage management program deletes all content of ROSS 204-2 but not the data blocks referenced by ROSS 204-1 or any other older snapshots. Action 910 ends method 900.

Additional details regarding snapshots are provided in co-pending U.S. patent application Ser. No. 10/655,951, entitled "TIME AND SPACE EFFICIENT TECHNIQUE FOR CREATING VIRTUAL VOLUME COPIES," and U.S.

patent application Ser. No. 10/655,963, entitled "EFFICIENT AND RELIABLE VIRTUAL VOLUME MAPPING," both filed concurrently. These applications are assigned to the same Assignee as the present application and are hereby incorporated by reference in their entireties.

Various other adaptations and combinations of features of the embodiments disclosed are within the scope of the invention. For example, the number of levels of address tables can be varied to suit the size of the base block address of a data block. Numerous embodiments are encompassed by the following claims.

What is claimed is:

1. A chain of snapshots for preserving data, comprising:
   a first snapshot, wherein the first snapshot is a read only snapshot that cannot be written by a user; and
   a second snapshot descending from the first snapshot, wherein the second snapshot is a read-write snapshot that can be written by the user.

2. The chain of snapshots of claim 1, further comprising a third snapshot descending from the first snapshot, wherein the third snapshot is another read-write snapshot.

3. The chain of snapshots of claim 1, further comprising a third snapshot descending from the second snapshot, wherein the third snapshot is another read only snapshot.

4. The chain of snapshots of claim 1, wherein at least one of the first and the second snapshots comprises:
   a table comprising a plurality of entries corresponding to first parts of block addresses;
   wherein one of the plurality of entries contains a pointer to contiguous data blocks in said at least one of the first and the second snapshots.

5. The chain of snapshots of claim 1, wherein at least one of the first and the second snapshots comprises:
   a first table comprising a first plurality of entries corresponding to first parts of block addresses;
   a second table comprising a second plurality of entries corresponding to second parts of block addresses;
   wherein one of the first plurality of entries contains a pointer to the second table and one of the second plurality of entries contains a pointer to contiguous data blocks in said at least one of the first and the second snapshots.

6. A method for writing to data blocks in snapshots for preserving data, comprising:
   creating a first snapshot, wherein the first snapshot is a read only snapshot that cannot be written by a user; and
   creating a second snapshot descending from the first snapshot, wherein the second snapshot is a read-write snapshot that can be written by the user.

7. The method of claim 6, further comprising creating a third snapshot descending from the first snapshot, wherein the third snapshot is another read-write snapshot.

8. The method of claim 6, further comprising creating a third snapshot descending from the second snapshot, wherein the third snapshot is another read only snapshot.

9. The method of claim 6, wherein at least one of said creating a first snapshot and said creating a second snapshot comprises:
   creating a first table comprising a first plurality of entries corresponding to first parts of block addresses.

10. The method of claim 9, further comprising writing one or more data blocks to the first snapshot or the second snapshot, said writing comprising:
    saving said one or more data blocks in a page of contiguous data blocks; and
    writing one of the first plurality of entries with a pointer to the page of the contiguous data blocks if said one or more data blocks consist all of the data blocks with the same first part of their block addresses.

11. The method of claim 9, further comprising writing one or more data blocks to the first snapshot or the second snapshot, said writing comprising:
    creating a second table comprising a second plurality of entries corresponding to second parts of block addresses;
    saving said one or more data blocks in a page of contiguous data blocks;
    writing one of the first plurality of entries with a pointer to the second table; and
    writing one of the second plurality of entries with a pointer to the page of the contiguous data block if said one or more data blocks consist all of the data blocks with the same first part and the same second part of their block addresses.

12. The method of claim 9, further comprising, prior to said writing the data block:
    determining if the write request is a first write to the data block in the second snapshot; and
    if the write request is the first write to the data block in the second snapshot, copying the data block to a third snapshot descending from the second snapshot, wherein the third snapshot is a read-only snapshot.

* * * * *